United States Patent [19]

Taggart et al.

[11] Patent Number: 4,690,217

[45] Date of Patent: Sep. 1, 1987

[54] PROCESS FOR WATER INJECTIVITY IMPROVEMENT TREATMENT OF WATER INJECTION WELLS

[75] Inventors: Davis L. Taggart; Edward W. Heffern, both of Tulsa, Okla.

[73] Assignee: Amoco Corporation, Chicago, Ill.

[21] Appl. No.: 897,179

[22] Filed: Aug. 15, 1986

[51] Int. Cl.$^4$ ............................................. E21B 43/22
[52] U.S. Cl. .................................. 166/274; 166/273; 166/305.1; 252/8.554
[58] Field of Search ............ 166/273, 274, 275, 305.1; 252/8.554

[56] References Cited

U.S. PATENT DOCUMENTS

| | | | |
|---|---|---|---|
| 2,978,409 | 4/1981 | Greenwald et al. | 252/8.554 |
| 3,016,351 | 1/1962 | Hessel et al. | 252/8.554 X |
| 3,346,047 | 10/1967 | Townsend et al. | 252/8.554 X |
| 3,670,819 | 6/1972 | Dauben et al. | 166/305.1 |
| 4,165,785 | 8/1979 | Schievelbein | 252/8.554 X |
| 4,212,748 | 7/1980 | Ferrell et al. | 252/8.554 |
| 4,293,428 | 10/1981 | Gale et al. | 166/273 X |
| 4,299,711 | 11/1981 | Tyler et al. | 252/8.554 |
| 4,319,636 | 3/1982 | Kudchadker et al. | 252/8.554 |
| 4,406,798 | 9/1983 | Miller et al. | 252/8.554 |
| 4,414,119 | 11/1983 | Duke, Jr. | 252/8.554 |

Primary Examiner—George A. Suchfield
Attorney, Agent, or Firm—L. Wayne White

[57] ABSTRACT

A method for improving the injectivity of water injection wells in those formations with a low permeability to water as compared to the formation's absolute permeability by the removal of residual oil from the formation pore spaces in the near injection wellbore area through the injection of an aqueous fluid containing an effective amount of surface-active agent. The surface-active agent has the general formula

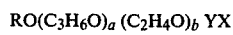

$$RO(C_3H_6O)_a (C_2H_4O)_b YX$$

where:
R is an alkyl group containing about 3 to about 20 carbon atoms or an alkyl phenol where the alkyl portion of the alkyl phenol contains from about 3 to about 20 carbon atoms or a mixture thereof;
a has an average value of between 0 and about 10;
b has an average value of between about 1 and about 10;
Y is a sulfate or sulfonate group; and
X is a cation, preferably monovalent.

11 Claims, No Drawings

PROCESS FOR WATER INJECTIVITY IMPROVEMENT TREATMENT OF WATER INJECTION WELLS

BACKGROUND OF THE INVENTION

This invention relates to a method for recovering oil from a subterranean formation by a waterflood and more particularly relates to a method for accelerating the recovery of oil by the waterflood process.

Since only a portion of the original oil in a subterranean oil-containing formation is produced through primary recovery, i.e., where the initial formation energy, supplemented by gas lifting, gas repressurization and mechanical pumping, if necessary, is used to recover the crude oil, it is necessary to utilize secondary recovery techniques to increase the ultimate recovery of oil.

The most economical and widely practiced secondary recovery technique is waterflooding, where an aqueous fluid is introduced into the subterranean formation through injection wells to drive oil through the formation to offset production wells.

Much work has been done on improving the efficiency of the waterflood process through the use of additives, such as surface-active agents or surfactants. It is thought that after a typical waterflood process, much of the oil is left behind in the formation pore spaces as discrete droplets which, because of the high interfacial tension between the injected water and the formation oil, are unable to deform and flow through the flow channels which link the pore spaces in the formation. It is thought that the addition of surface-active agents or surfactants lowers the interfacial tension between the injected water and reservoir oil, which in turn allows the oil droplets to deform and flow through the flow channels linking the pore spaces and thereby flow to the production wells. U.S. Pat. No. 4,293,428 is directed to the injection of certain propoxylated and ethoxylated sulfate, sulfonate, phosphate or carboxylate surfactants in high salinity formations, with the subsequent use of a driving fluid to displace oil from the formation and to recover the displaced oil.

Much work has also been done on improving the injectivity of water injection wells, i.e., the ability to inject water into an oil-containing subterranean formation through a wellbore, by the removal of residual oil from the formation pore spaces in the near wellbore area. An increase in injectivity, while not resulting in any increase in the amount of oil recovered, does serve to accelerate the rate of recovery of oil, thereby improving the economics of the waterflood process. U.S. Pat. No. 3,670,819 is directed to such process. In this patent, the use of an oil external micellar slug followed by a micellar slug of higher water content serves to remove the residual oil and organic deposits from around the injection well, thereby improving the water injectivity of the injection wells.

There is a substantial and unfulfilled need for alternative techniques to improve the injectivity of water injection wells to be used in certain waterflood processes where there is a low formation permeability to water as compared to the formation absolute permeability due to the presence of residual oil in the formation pore spaces.

SUMMARY OF THE INVENTION

The objective of improving the injectivity of water injection wells in certain waterflood processes, where there is a low formation permeability to water as compared to the formation's absolute permeability due in large part to the presence of residual oil in the formation pore spaces, is achieved in the present invention by removal of this residual oil saturation from the formation pore spaces in the near wellbore area. This is accomplished by injecting a suitable amount of surface-active agent or surfactant to sweep the residual oil from the formation pore spaces in the near wellbore area, i.e., an area extending radially outward a distance between roughly 5 to roughly 50 feet from the injection well, followed by injection of an aqueous fluid for the waterflood process. The surfactant is selected from the group of compounds characterized by the general formula:

$$RO(C_3H_6O)_a (C_2H_4O)_b YX$$

where:

R is an alkyl group containing from about 3 to about 20 carbon atoms or an alkyl phenol where the alkyl portion of the alkyl phenol contains from about 3 to about 20 carbon atoms or a mixture thereof;

a has an average value of from 0 to about 10;

b has an average value of from about 1 to about 10;

Y is a sulfate or sulfonate group; and

X is a cation, preferably monovalent.

Optionally, the surface-active agent or surfactant can be followed by the injection of a second slug of surface-active agent or surfactant with the same general formula as the first surface-active agent or surfactant but wherein the value of "a" is decreased and/or the value of "b" is increased, thereby rendering to the second slug of surface-active agent a higher water solubility.

DETAILED DESCRIPTION OF THE INVENTION

In achieving the objective of this invention, a solution is injected into a subterranean formation through an injection well to remove residual oil from the formation pore spaces in the near wellbore area prior to waterflooding. This solution contains an aqueous fluid and an effective amount of surface-active agent or surfactant selected from the group having the general formula:

$$RO(C_3H_6O)_a (C_2H_4O)_b YX$$

where:

R is an alkyl group containing from about 3 to about 20 carbon atoms or an alkyl phenol where the alkyl portion of the alkyl phenol contains from about 3 to about 20 carbon atoms or a mixture thereof;

a has an average value of from 0 to about 10;

b has an average value of from about 1 to about 10;

Y is a sulfate or sulfonate group; and

X is a cation, preferably monovalent such as an alkali metal or ammonia cation.

Surfactants of the types described above can be prepared in a number of ways, commonly known to those skilled in this art.

The amount of solution containing the above surface-active agent or surfactant injected will vary depending on the concentration of surface-active agent or surfactant in the solution and the pore space volume of the near wellbore area. The intent is to improve the injectivity of water injection wells in those cases where there is a low formation permeability to water as compared to the formation's absolute permeability due to the presence of residual oil in the formation pore spaces. This is accomplished through the use of the surface-active agent or surfactant of this invention to remove the residual oil from the pore spaces in the oil-containing formation in the area extending radially outward a distance of from roughly 5 to about 50 feet from the injection well. Based upon radial flow calculations, it is thought that a twofold injectivity improvement can be obtained by removing residual oil saturation from this near-wellbore area where the formation permeability to water is less than about 20% of the formation's absolute permeability. While it is thought that this process will not result in a significant increase in the amount of oil recovered over that amount otherwise recoverable by the waterflood process, the increased rate of water injection should accelerate the recovery of oil by the waterflood process, thereby improving the economics of the waterflood process.

An effective concentration of surface-active agent or surfactant in the injected solution will vary between about 0.1 and 5% by weight of the aqueous fluid and surface-active agent. The amount of surface-active agent or surfactant solution required to sweep the oil from the near wellbore area can be determined by those skilled in the art. However, the volume of surface-active agent or surfactant solution injected will normally be less than 1 percent of the oil-containing reservoir pore space volume between the injection well and production wells.

Optionally, the injection of the surface-active agent can be followed by the injection of a second solution of surface-active agent or surfactant with the same general formula as the first surface-active agent or surfactant, but where the value of "a" is decreased and/or the value of "b" is increased, thereby imparting a higher water solubility to the second solution of surface-active agent than to the first.

In the preferred embodiment, this second surfactant is selected from the group of compounds characterized by the general formula:

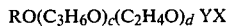

where:

R is an alkyl group containing from about 3 to about 20 carbon atoms or an alkyl phenol where the alkyl portion of the alkyl phenol contains from about 3 to about 20 carbon atoms or a mixture thereof;

c has an average value of from 0 to about 10;

d has an average value of from about 1 to about 10;

Y is a sulfate or sulfonate group;

X is a cation, preferably monovalent; and where "c" is less than "a" for the first surface-active agent and/or "d" is larger than "b" for the first surface-active agent.

The following specific examples illustrate the use of the herein-described process for the improvement of water injection well injectivity in those cases where there is a low formation permeability to water as compared to the formation's absolute permeability. It is to be understood that these samples are for the purpose of illustration only and are not to be regarded as a limitation of the present invention.

EXAMPLE 1

This example illustrates the comprehensive nature of initial laboratory core testing done utilizing the process of the present invention.

Initial core testing was done in low permeability Berea cores at 205° F. The cores were mounted in a commercially available Hassler core holder saturated with an oil field brine and then saturated with actual degassed oil field separator oil down to a typical oil field connate water/oil saturation. The cores were then waterflooded down to residual waterflood oil saturation. Next, a bank of 2 percent by weight first surfactant solution chosen so as to simulate what would happen in the near wellbore area in the process of the present invention was injected into the cores. This was followed by the injection of a bank of 1 percent by weight second surfactant solution into the cores. The surfactants utilized in this test were prepared from a blend of alcohols with from about 12 to about 15 carbon atoms. In the case of the first surfactant, the alcohol blend was propoxylated so that there were an average of 2 propoxylate groups on each surfactant molecule and ethoxylated so that there were an average of 3 ethoxylate groups on each surfactant molecule, and finally sulfated. In the case of the second surfactant, the alcohol blend was ethoxylated so that there were an average of 3 ethoxylate groups on each surfactant molecule and sulfated. Finally, these surfactants were displaced through the cores with an oil field brine.

In comparing the brine injection before the injection of surfactant and after the injection of surfactant, it was discovered that at the residual waterflood oil saturation the relative permeability to water was roughly 15 millidarcies (or 13 percent of the absolute permeability). During the injection of brine after the injection of surfactants, the relative permeability to water rose to roughly 88.5 millidarcies. This represented roughly a sixfold increase in injectivity. As a result of this improvement in injectivity, further core testing was performed.

EXAMPLE 2

This example illustrates further core testing done utilizing the process of the present invention.

Cores for this test were obtained from a well drilled in the Lockhart Crossing Field in Livingston Parish, Louisiana. This field was known to have a low formation permeability to water compared to the absolute formation permeability.

The cores were mounted in a commercially available Hassler core holder and cleaned by injection of methanol-chloroform followed by methanol. The cores were then saturated with Lockhart Crossing injection brine produced from the Lockhart Crossing Field. Next, the cores were saturated with degassed separator oil from the Lockhart Crossing Field to a concentration equaling the connate oil saturation. The cores were then waterflooded down to residual waterflood oil saturation. Then a bank of 2% by weight surfactant comprising a blend of alcohols with from 12 to 15 carbon atoms which was ethoxylated, propoxylated and sulfated so that there were an average of 2 propoxylate groups and 3 ethoxylate groups on each surfactant molecule, was injected. This was followed with a bank of 1% by weight surfactant comprising a blend of alcohols with from 12 to 15 carbon atoms which was ethoxylated and sulfated so that there were an average of 3 ethoyxlate groups on each surfactant molecule. In comparing the brine injection before the injection of surfactants and after injection of surfactant, the relative permeability to water at the residual waterflood oil saturation was roughly 6.5 millidarcies. During the injection of brine after the injection of surfactants, the relative permeability to water rose to roughly 65 millidarcies representing nearly a tenfold increase in injectivity. Clearly, from these results it can be seen that the injection of the surfactants of the present invention effectively displace oil from the near wellbore area, thereby significantly increasing the relative permeability to water.

Many modifications and variations of the invention here and before set forth may be made without departing from the scope thereof and therefore, only such limitations that should be imposed are indicated in the appended claims.

What is claimed is:

1. A method for enhancing the injectivity into an injection well and thereby accelerating the recovery of oil by a waterflood process from an oil-bearing subterranean formation penetrated by at least one injection well and at least one production well wherein the near wellbore area of the formation penetrated by the injection well has a low formation permeability to water as compared to the formation's absolute permeability, said method comprising:

injecting into the formation through an injection well, an aqueous fluid containing a first surface-active agent in an amount suitable to sweep the residual oil from the formation pore spaces in the near wellbore area and to thereby improve the water injectivity of said injection well, wherein the first surface-active agent has a general formula:

$$RO(C_3H_6O)_a (C_2H_4O)_b YX$$

where:
R is an alkyl group containing from about 3 to about 20 carbon atoms or an alkyl phenol, wherein the alkyl portion of the alkyl phenol contains from about 3 to about 20 carbon atoms or a mixture thereof;
a has an average value of from 0 to about 10;
b has an average value of from about 1 to about 10;
Y is a sulfate or sulfonate; and
X is a cation; and
thereafter injecting an aqueous fluid into the formation through the injection well.

2. The method as recited as claim 1 wherein the effective amount of the first surface-active agent is between about 0.1 and 5 percent by weight of the aqueous fluid containing an effective amount of a first surface-active agent.

3. The method as recited in claim 2 wherein the volume of aqueous fluid containing an effective amount of a first surface active-agent injected into the formation is less than about 1 percent of the volume of formation pore spaces in the oil-bearing subterranean formation between the injection and production well.

4. The method as recited in claim 1 wherein the injection of aqueous fluid containing an effective amount of a first surface-active agent is followed by the injection of an aqueous fluid containing an an effective amount of a second surface-active agent with a higher water solubility than the first surface-active agent, wherein the second surface-active agent has the general formula $$RO(C_3H_6O)_c(C_2H_4O)_d YX$$

where:
R is an alkyl group containing from about 3 to about 20 carbon atoms or an alkyl phenol, the alkyl portion of the alkyl phenol contains from about 3 to about 20 carbon atoms or a mixture thereof;
c has an average value of from 0 to about 10;
d has an average value of from about 1 to about 10;
Y is a sulfate or sulfonate; and
X is a cation.

5. The method as recited in claim 4 wherein "c" is less than "a".

6. The method as recited in claim 4 wherein "d" is greater than "b".

7. The method as recited in claims 1 or 4 wherein the cation is a monovalent cation.

8. The method as recited in claims 1 or 4 wherein the cation is an alkali metal cation or ammonnia cation.

9. The method as recited in claims 1 or 4 wherein R is an alkyl group containing from about 12 to about 15 carbon atoms or a mixture thereof.

10. The method as recited in claim 3 wherein the injection of aqueous fluid containing an effective amount of a first surface-active agent is followed by the injection of an aqueous fluid containing an effective amount of a second surface-active agent with a higher water solubility than the surface-active agent, wherein the second surface-active agent has the general formula:

$$RO(C_3H_6O)_c (C_2H_4O)_d YX$$

where:
R is an alkyl group containing from about 3 to about 20 carbon atoms or an alkyl phenol, the alkyl portion of the alkyl phenol contains from about 3 to about 20 carbon atoms or a mixture thereof;
c has an average value of from 0 to about 10;
d has an average value of from about 1 to about 10;
Y is a sulfate or sulfonate; and
X is a cation.

11. A method of treating the near wellbore area of an injection well which penetrates a subterranean formation having a low formation permeability to water, as compared to the formation's absolute permeability, and to thereby enhance the injectivity of said well, said method comprising injecting into the formation through an injection well an aqueous fluid containing a first surface-active agent in an amount suitable to sweep the residual oil from the formation pore spaces in the near wellbore area and to thereby improve the water injectivity of said injection well, wherein the first surface-active agent has the general formula:

$$RO(C_3H_6O)_a (C_2H_4O)_b YX$$

where:
R is an alkyl group containing from about 3 to about 20 carbon atoms or an alkyl phenol, wherein the alkyl portion of the alkyl phenol contains from about 3 to about 20 carbon atoms or a mixture thereof;
a has an average value of from 0 to about 10;
b has an average value of from about 1 to about 10;
Y is a sulfate or a sulfonate; and
X is a cation.

* * * * *